(12) United States Patent
Sharma et al.

(10) Patent No.: US 12,361,725 B2
(45) Date of Patent: Jul. 15, 2025

(54) MACHINE LEARNING BASED HUD SYSTEM WITH ALERTS FOR HIDDEN BODIES

(71) Applicant: GM Global Technology Operations LLC, Detroit, MI (US)

(72) Inventors: Manoj Sharma, Troy, MI (US); Joseph F. Szczerba, Grand Blanc, MI (US); Akilesh Rajavenkatanarayanan, Macomb, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 272 days.

(21) Appl. No.: 18/188,099

(22) Filed: Mar. 22, 2023

(65) Prior Publication Data

US 2024/0320868 A1    Sep. 26, 2024

(51) Int. Cl.
| | |
|---|---|
| G06V 20/58 | (2022.01) |
| B60R 1/24 | (2022.01) |
| G02B 27/01 | (2006.01) |
| G06F 3/01 | (2006.01) |
| G06T 11/00 | (2006.01) |

(Continued)

(52) U.S. Cl.
CPC ............... *G06V 20/58* (2022.01); *B60R 1/24* (2022.01); *G02B 27/01* (2013.01); *G02B 27/0101* (2013.01); *G02B 27/0179* (2013.01); *G06F 3/013* (2013.01); *G06T 11/00* (2013.01); *G06V 10/82* (2022.01); *G06V 20/20* (2022.01); *G06V 20/56* (2022.01); *H04N 7/183* (2013.01); *H04N 23/957* (2023.01); *B60R 2300/205* (2013.01); *B60R 2300/307* (2013.01); *G02B 2027/0138* (2013.01); *G02B 2027/014* (2013.01); *G02B 2027/0141* (2013.01); *G02B 2027/0187* (2013.01); *G06V 10/774* (2022.01); *H04N 23/54* (2023.01)

(58) Field of Classification Search
None
See application file for complete search history.

(56) References Cited

U.S. PATENT DOCUMENTS

| | | | | |
|---|---|---|---|---|
| 5,790,125 | A * | 8/1998 | Bui | G06F 3/14 |
| | | | | 345/581 |
| 2010/0073368 | A1 * | 3/2010 | Kim | G06T 15/40 |
| | | | | 345/422 |

(Continued)

FOREIGN PATENT DOCUMENTS

| | | | | |
|---|---|---|---|---|
| WO | WO-2023133285 A1 * | 7/2023 | | G06T 7/13 |

*Primary Examiner* — Jwalant Amin
(74) *Attorney, Agent, or Firm* — Vivacqua Crane, PLLC

(57) ABSTRACT

A system for identifying hidden bodies and providing augmentation within a head up display of a vehicle including at least one front camera adapted to collect images of an environment in front of the vehicle within and adjacent to a roadway on which the vehicle is traveling, an augmented reality head up display adapted to project an image upon an inner surface of a windshield of the vehicle, an augmented reality display adapted to project an image within the windshield, the controller adapted to use a trained neural network stored therein to map images captured by the at least one front camera to light field camera images stored within the trained neural network and to identify hidden bodies within the images captured by the at least one front camera, and display, within a windshield of the vehicle, augmentation graphics for the identified hidden bodies.

20 Claims, 7 Drawing Sheets

(51) Int. Cl.
*G06V 10/82* (2022.01)
*G06V 20/20* (2022.01)
*G06V 20/56* (2022.01)
*H04N 7/18* (2006.01)
*H04N 23/957* (2023.01)
*G06V 10/774* (2022.01)
*H04N 23/54* (2023.01)

(56) References Cited

U.S. PATENT DOCUMENTS

| | | | |
|---|---|---|---|
| 2015/0244997 A1* | 8/2015 | Masuko | G06T 11/40 348/747 |
| 2016/0054452 A1* | 2/2016 | Cosatto | G01S 11/12 701/412 |
| 2017/0187963 A1* | 6/2017 | Lee | G01C 21/365 |
| 2017/0212633 A1* | 7/2017 | You | B60K 35/00 |
| 2019/0114921 A1* | 4/2019 | Cazzoli | G06V 20/58 |
| 2019/0225214 A1* | 7/2019 | Pohl | B60W 30/095 |
| 2020/0189390 A1* | 6/2020 | Viswanathan | G01C 21/3837 |
| 2020/0210777 A1* | 7/2020 | Valois | B60W 60/0025 |
| 2021/0360211 A1* | 11/2021 | Kawamura | B60K 35/425 |
| 2022/0075189 A1* | 3/2022 | Hirata | G09G 3/002 |
| 2022/0230383 A1* | 7/2022 | Tian | G06T 19/006 |
| 2024/0404103 A1* | 12/2024 | Lee | G06T 7/73 |

* cited by examiner

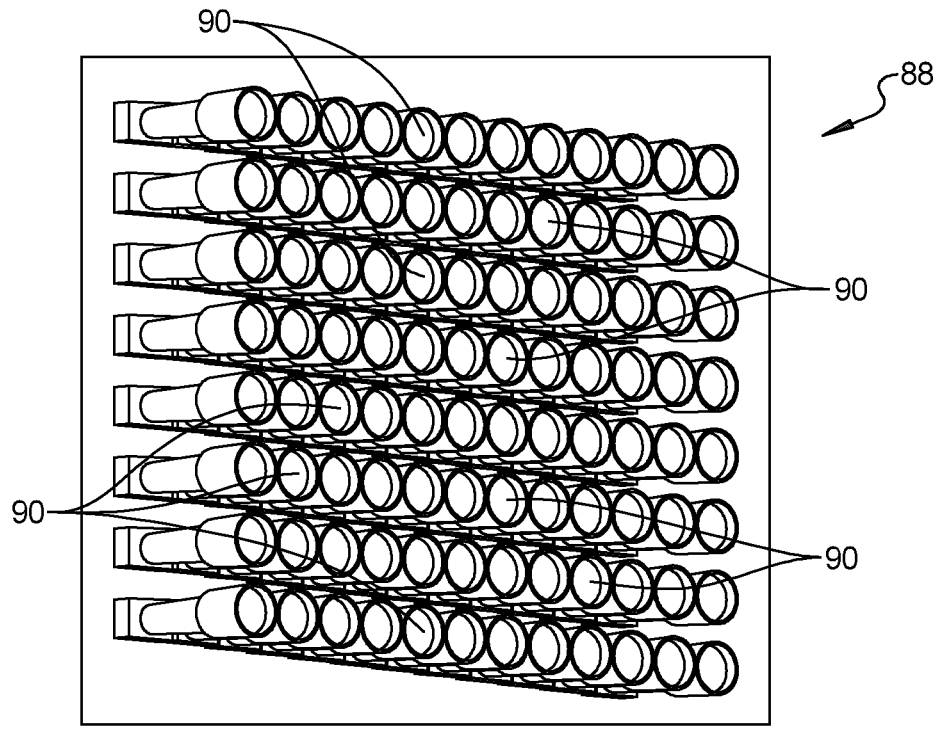
FIG. 7
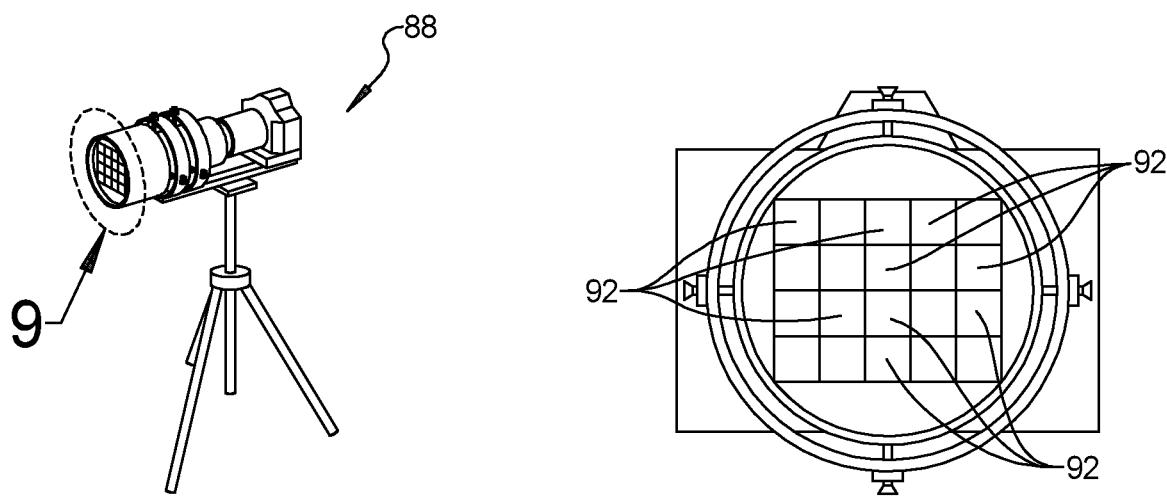
FIG. 8
FIG. 9

MACHINE LEARNING BASED HUD SYSTEM WITH ALERTS FOR HIDDEN BODIES

INTRODUCTION

The present disclosure relates to a system that uses an augmented reality head up display and a machine learning neural network to identify hidden bodies within or near the path of a vehicle and provides an augmentation graphic to alert an occupant within the vehicle to the presence of such hidden objects.

Often accidents happen because even though an occupant of a vehicle is alert and watching the roadway in front of a vehicle, hidden objects may be present within or adjacent to the roadway on which the vehicle is traveling, and may enter the roadway unexpectedly and without leaving sufficient time for the driver/occupant of the vehicle to react.

Thus, while current systems and methods achieve their intended purpose, there is a need for a new and improved system and method for identifying hidden bodies within or near the path of a vehicle and providing an augmentation graphic to alert an occupant within the vehicle to the presence of such hidden objects.

SUMMARY

According to several aspects of the present disclosure, a system for identifying hidden bodies and providing augmentation within a head up display of a vehicle includes at least one front camera adapted to collect images of an environment in front of the vehicle within a roadway on which the vehicle is traveling and adjacent the roadway on either side, an augmented reality head up display in communication with a controller and adapted to project an image upon an inner surface of a windshield of the vehicle, an augmented reality display in communication with the controller and adapted to project an image within the windshield, and the controller in electronic communication with the at least one front camera, the controller adapted to use a trained neural network stored therein to map images captured by the at least one front camera to light field camera images stored within the trained neural network and to identify hidden bodies within the images captured by the at least one front camera that are at least partially obscured by other bodies within the images captured by the at least one front camera, and display, within a windshield of the vehicle, augmentation graphics for the identified hidden bodies in real time as such hidden bodies are identified.

According to another aspect, the trained neural network includes machine learning algorithms collected by training an algorithm to detect hidden bodies in light field images extracted from data collected by a light field camera array mounted onto a control vehicle.

According to another aspect, the controller is further adapted to, when hidden bodies are identified within the images captures by the at least one front camera, determine proper augmentation graphics for the identified hidden bodies.

According to another aspect, when displaying, within the windshield of the vehicle, augmentation graphics for the identified hidden bodies, the controller is further adapted to display, with the alternate reality head up display, on the inner surface of the windshield, augmentation graphics for the identified hidden bodies adapted to draw an occupant of the vehicle's attention to such identified hidden bodies.

According to another aspect, when displaying, within the windshield of the vehicle, augmentation graphics for the identified hidden bodies, the controller is further adapted to display, with the augmented reality display, within the windshield, augmentation graphics for the identified hidden bodies adapted to draw an occupant of the vehicle's attention to such identified hidden bodies.

According to another aspect, the augmented reality display includes a transparent substrate, having light emitting particles dispersed therein, positioned on the windshield, a primary graphic projection device for generating a first set of images upon the windshield based on visible light, wherein the first set of images are displayed upon a primary area of the window, a secondary graphic projection device for generating a second set of images upon a secondary area the windshield based on an excitation light, wherein the light emitting particles in the transparent substrate emit visible light in response to absorbing the excitation light, and wherein the first set of images displayed upon the primary area of the windshield cooperate with the second set of images displayed upon the secondary area of the windshield to create an edge-to-edge augmented reality view of the environment in front of the vehicle within the roadway on which the vehicle is traveling and adjacent the roadway on either side, a primary graphics processing unit in electronic communication with the primary graphic projection device and the controller, and a secondary graphics processing unit in electronic communication with the secondary graphic projection device and the controller.

According to another aspect, the system further includes a driver monitoring system in communication with the controller and adapted to track a position of an occupant's eyes.

According to another aspect, the controller is further adapted to receive data from the driver monitoring system related to the position of the occupant's eyes and to display augmentation graphics within the windshield at a position such that the augmentation graphics are perceived by the occupant in proximity to the corresponding identified hidden bodies.

According to another aspect, the trained neural network includes machine learning algorithms adapted to detect hidden bodies within extracted images from data collected with a light field camera array, wherein the controller is adapted to map images collected by the at least one front camera onto the light field camera array images and use the machine learning algorithms to identify hidden bodies within the images collected by the at least one front camera.

According to several aspects of the present disclosure, a method of identifying hidden bodies and providing augmentation within a head up display of a vehicle includes collecting, with at least one front camera, images of an environment in front of the vehicle within a roadway on which the vehicle is traveling and adjacent the roadway on either side, using, with a controller in electronic communication with the at least one front camera, a trained neural network stored therein and mapping images captured by the at least one front camera to light field camera images stored within the trained neural network, identifying, with the controller, hidden bodies within the images captured by the at least one front camera that are at least partially obscured by other bodies within the images captured by the at least one front camera, and displaying, within a windshield of the vehicle, augmentation graphics for the identified hidden bodies in real time as such hidden bodies are identified.

According to another aspect, the neural network is trained by collecting data from a light field camera array mounted onto a control vehicle, training a machine learning algorithm to detect hidden bodies in in an image extracted from the collected data, and transferring the machine learning algorithm to the neural network that is in communication with the at least one front camera.

According to another aspect, the method further includes, when hidden bodies are identified within the images captured by the at least one front camera, determining, with the controller, a proper augmentation graphics for the identified hidden bodies.

According to another aspect, the displaying, within the windshield of the vehicle, augmentation graphics for the identified hidden bodies further includes displaying, with at least one light source of a projection module adapted to project an image upon an inner surface of a windshield of the vehicle and in electronic communication with the controller, augmentation graphics for the identified hidden bodies adapted to draw an occupant of the vehicle's attention to such identified hidden bodies.

According to another aspect, the displaying, within the windshield of the vehicle, augmentation graphics for the identified hidden bodies further includes displaying, with an augmented reality display in communication with the controller and positioned within the vehicle, augmentation graphics for the identified hidden bodies adapted to draw an occupant of the vehicle's attention to such identified hidden bodies.

According to another aspect, the augmented reality display includes a transparent substrate, having light emitting particles dispersed therein, positioned on the windshield, a primary graphic projection device for generating a first set of images upon the windshield based on visible light, wherein the first set of images are displayed upon a primary area of the windshield, a secondary graphic projection device for generating a second set of images upon a secondary area the windshield based on an excitation light, wherein the light emitting particles in the transparent substrate emit visible light in response to absorbing the excitation light, and wherein the first set of images displayed upon the primary area of the windshield cooperate with the second set of images displayed upon the secondary area of the windshield to create an edge-to-edge augmented reality view of the environment in front of the vehicle within the roadway on which the vehicle is traveling and adjacent the roadway on either side, a primary graphics processing unit in electronic communication with the primary graphic projection device and the controller, and a secondary graphics processing unit in electronic communication with the secondary graphic projection device and the controller.

According to another aspect, system further includes a driver monitoring system in communication with the controller and adapted to track a position of an occupant's eyes.

According to another aspect, the method further includes receiving data, with the controller, from the driver monitoring system related to the position of the occupant's eyes, and, displaying augmentation graphics within the windshield at a position such that the augmentation graphics are perceived by the occupant in proximity to the corresponding identified hidden bodies.

According to another aspect, the trained neural network includes machine learning algorithms adapted to detect hidden bodies within extracted images from data collected with a light field camera array, wherein, the method includes mapping images collected by the at least one front camera onto the light field camera array images and using the machine learning algorithms to identify hidden bodies within the images collected by the at least one front camera.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 7 is a perspective view of a light field camera array in accordance with an exemplary embodiment;

FIG. 8 is perspective view of a conventional camera equipped with a plurality of micro-lenses positioned in front of the camera;

FIG. 9 is an enlarged portion of FIG. 8, as indicated by the circled area labelled "9" in FIG. 8;

Figure 1:
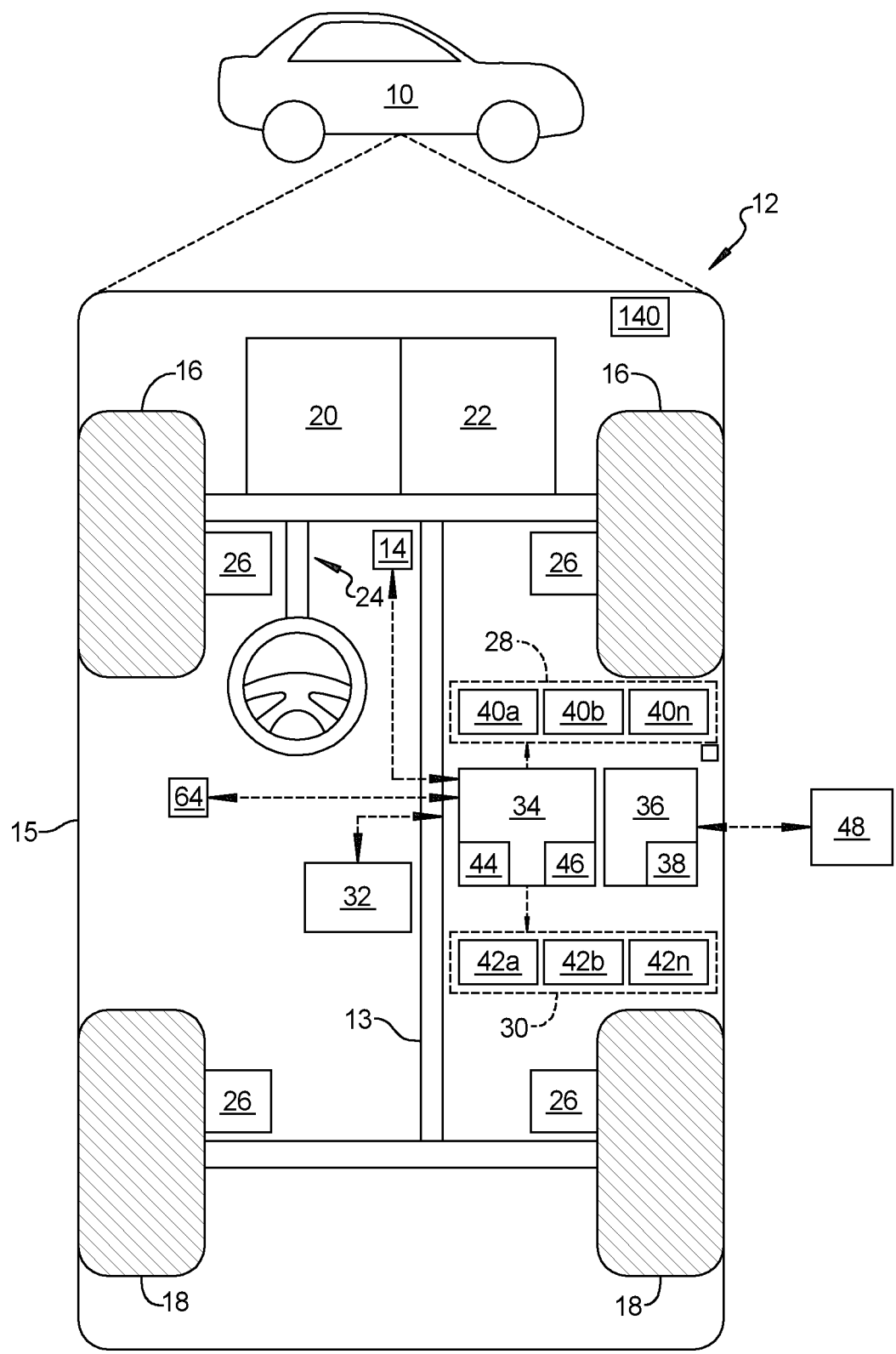
FIG. 1 is a schematic view of a vehicle including a system according to an exemplary embodiment of the present disclosure.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

In accordance with an exemplary embodiment, FIG. 1 shows a vehicle 10 with an associated system 12 for identifying hidden bodies and providing augmentation within an augmented reality head up display 14 of the vehicle 10. The vehicle 10 generally includes a chassis 13, a body 15, front wheels 16, and rear wheels 18. The body 15 is arranged on the chassis 13 and substantially encloses components of the vehicle 10. The body 15 and the chassis 13 may jointly form a frame. The front wheels 16 and rear wheels 18 are each rotationally coupled to the chassis 13 near a respective corner of the body 15.

In various embodiments, the vehicle 10 is an autonomous vehicle and the system 12 is incorporated into the autonomous vehicle 10. The autonomous vehicle 10 is, for example, a vehicle that is automatically controlled to carry passengers from one location to another. The autonomous vehicle 10 is depicted in the illustrated embodiment as a passenger car, but it should be appreciated that any other vehicle including motorcycles, trucks, sport utility vehicles (SUVs), recreational vehicles (RVs), etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. In other embodiments, the vehicle 10 is a low level autonomous vehicle that requires active attention by a driver of the vehicle.

As shown, the vehicle 10 generally includes a propulsion system 20, a transmission system 22, a steering system 24, a brake system 26, a sensor system 28, an actuator system 30, at least one data storage device 32, a controller 34, and a communication system 36. In an embodiment in which the autonomous vehicle 10 is an electric vehicle, there may be no transmission system 22. The propulsion system 20 may, in various embodiments, include an internal combustion engine, an electric machine such as a traction motor, and/or a fuel cell propulsion system. The transmission system 22 is configured to transmit power from the propulsion system 20 to the vehicle's front wheels 16 and rear wheels 18 according to selectable speed ratios. According to various embodiments, the transmission system 22 may include a step-ratio automatic transmission, a continuously-variable transmission, or other appropriate transmission. The brake system 26 is configured to provide braking torque to the vehicle's front wheels 16 and rear wheels 18. The brake system 26 may, in various embodiments, include friction brakes, brake by wire, a regenerative braking system such as an electric machine, and/or other appropriate braking systems. The steering system 24 influences a position of the front wheels 16 and rear wheels 18.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. In an exemplary embodiment, the sensing devices 40a-40n includes at least one front camera 140 adapted to collect images of an environment in front of the vehicle 10 within a roadway on which the vehicle 10 is traveling and adjacent the roadway on either side. The at least one front camera can include two or more digital cameras spaced at a selected distance from each other, in which the two or more digital cameras are used to obtain stereoscopic images of the surrounding environment in order to obtain a three-dimensional image. The sensing devices 40a-40n can includes sensors that monitor dynamic variables of the vehicle, such as its velocity, its acceleration, a number of times that the brake is applied, etc. The actuator system 30 includes one or more actuator devices 42a-42n that control one or more vehicle features such as, but not limited to, the propulsion system 20, the transmission system 22, the steering system 24, and the brake system 26.

The controller 34 includes at least one processor 44 and a computer readable storage device or media 46. The at least one data processor 44 can be any custom made or commercially available processor, a central processing unit (CPU), a graphics processing unit (GPU), an auxiliary processor among several processors associated with the controller 34, a semi-conductor based microprocessor (in the form of a microchip or chip set), a macro-processor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the at least one data processor 44 is powered down. The computer-readable storage device or media 46 may be implemented using any of a number of known memory devices such as PROMs (programmable read-only memory), EPROMS (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the at least one processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

The communication system 36 is configured to wirelessly communicate information to and from other entities 48, such as but not limited to, other vehicles ("V2V" communication,) infrastructure ("V2I" communication), remote systems, remote servers, cloud computers, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

Figure 2:
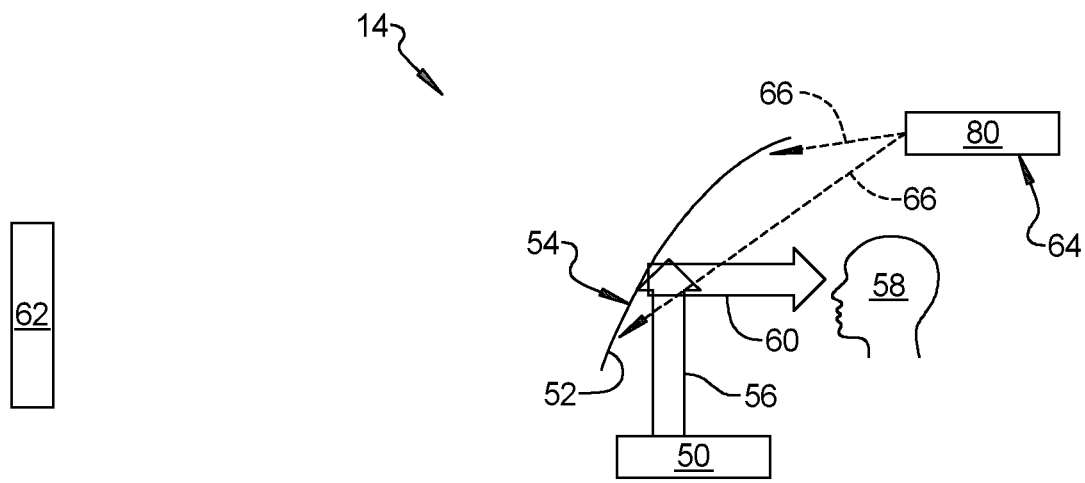
FIG. 2 is a schematic diagram of an augmented reality head up display within the system according to an exemplary embodiment.

Referring to FIG. 2, in an exemplary embodiment, the augmented reality head up display (AR-HUD) 14 includes a projector 50, which could be a hologram projector, that is adapted to project an image upward to an inner surface 52 of a windshield 54 within the vehicle 10, as indicated by arrow 56. The image is reflected from the inner surface 52 of the windshield 54 to the eyes of the occupant 58 of the vehicle 10, as indicated by arrow 60. The occupant 58 perceives the image 62 projected by the projector 50 within the environment in front of the vehicle 10. In an exemplary embodiment, the projector 12 includes a red laser and a first spatial light modulator associated with the red laser, a green laser and a second spatial light modulator associated with the green laser, and a blue laser and a third spatial light modulator associated with the blue laser. Each of the red, green and blue lasers project through the associated spatial light modulators and are collimated into an image that is projected upward, as indicated by arrow 56.

In an exemplary embodiment, the projector 50 includes a pupil expander or wave guide. The image is projected into the pupil expander and then propagates inside the pupil expander and is extracted multiple times. The re-circulation of the light several times within the pupil expander expands the pupil so the viewer can see the image from an extended eye-box. In addition to expanding the eye-box, the pupil expander also magnifies the original projected image coming out of the projector 50.

In another exemplary embodiment, a beam steering device is positioned between the projector 50 and the pupil expander. The beam steering device is adapted to adjust a look down angle (LDA) of the image projected through the beam steering device by the projector. In optical systems, beam steering may be accomplished by changing the refractive index of the medium through which the beam is transmitted or by the use of mirrors, prisms, lenses, or rotating diffraction gratings. Examples of optical beam steering approaches include mechanical mirror-based gimbals or beam-director units, galvanometer mechanisms that rotate mirrors, Risley prisms, phased-array optics, and microelectromechanical systems (MEMS) using micro-mirrors. In such systems, the controller 34 is in communication with the projector 50 and is adapted to compare the vertical location of the driver's eyes to a pre-determined nominal vertical location, and to adjust a virtual image distance (VID) of the holographic image projected by the hologram projector 50.

Figure 3:
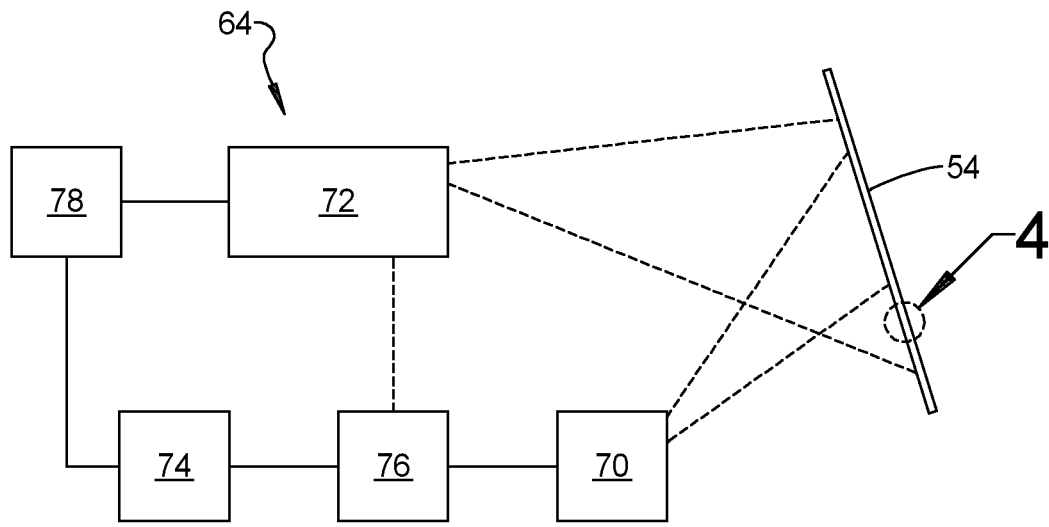
FIG. 3 is a schematic diagram of an augmented reality display of the system according to an exemplary embodiment.
Figure 4:
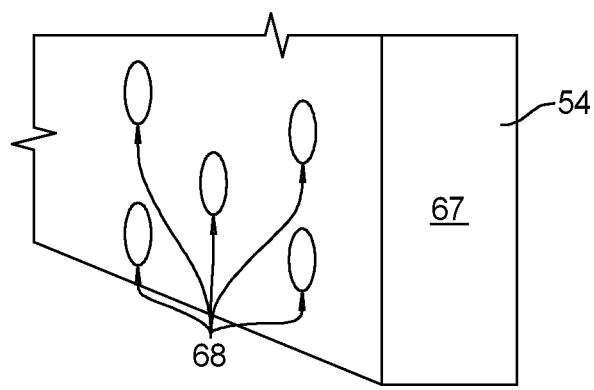
FIG. 4 is an enlarged portion of FIG. 3, as indicated by the circled area labelled "4" within FIG. 3.

In another exemplary embodiment, the system 12 includes an augmented reality display 64 in communication with the controller 34 and adapted to project an image within the windshield 54. The augmented reality display 64 may utilize transparent micro-LEDs or transparent organic LEDs (OLEDS). Referring to FIG. 2, in an exemplary embodiment, the augmented reality display 64 is adapted to present an image within the windshield 54 of the vehicle 10, as indicated by lines 66, that is visible to the occupant 58 within the vehicle 10. Referring to FIG. 3 and FIG. 4, the augmented reality display 64 includes a transparent substrate 67 affixed to the windshield 54 and including light emitting particles 68 embedded therein. As explained below, the augmented reality display 64 includes a primary graphic projection device 70 and a secondary graphic projection device 72 that work together to provide an image displayed on the windshield 54 of the vehicle 10.

The augmented reality display 64 includes one or more controllers 74 in electronic communication with the controller 34, a primary graphics processing unit 76 corresponding to the primary graphic projection device 70, and a secondary graphics processing unit 78 corresponding to the secondary graphic projection device 72. The primary graphics processing unit 76, the primary graphic projection device 70, the secondary graphics processing unit 78, and the secondary graphic projection device 72 are housed within a projection module 80 mounted within the autonomous vehicle 10.

When excitation light is absorbed by the light emitting particles 68, visible light is generated by the light emitting particles 68. In an embodiment, the light emitting particles 68 are red, green, and blue (RGB) phosphors for full color operation, however, it is to be appreciated that monochrome or a two-color phosphor may be used as well. In an exemplary embodiment, the primary graphic projection device 70 and the secondary graphic projection device 72 provide ultraviolet light (UV) projections adapted to excite the light emitting particles 68. In other embodiments, not utilizing light emitting particles 68 that depend on excitation, either of the primary graphic projection device 70 and the secondary graphic projection device 72 could project visible light, rather than UV light. The primary graphic projection device 70 generates a first set of images upon a primary area of the windshield 54 based on visible light, and the secondary graphic projection device 72 generates a second set of images upon a secondary area of the windshield 54 based on an excitation light. Specifically, the light emitting particles 68 dispersed within the transparent substrate 67 emit visible light in response to absorbing the excitation light emitted by the secondary graphic projection device 72. The first set of images cooperate with the second set of images to create an edge-to-edge display on the windshield 54. This is important, as the HUD is only capable of displaying information and graphics within a field of view (FOV) of the HUD. When images are needed to be presented to an occupant 58 that fall outside of the FOV of the AR-HUD, the augmented reality display 64 is the only way to accomplish this. The augmented reality display 64 is capable of providing images that appear across the entire surface of the windshield 54. The primary graphic projection device 70 includes a visible light source configured to generate the first set of images upon the windshield 54. The visible light source may be, for example, a laser or light emitting diodes (LEDs).

Further details of the augmented reality display are included in U.S. patent application Ser. No. 17/749,464 to Seder et al., filed on May 20, 2022 and which is hereby incorporated by reference into the present application.

The augmented reality head up display 14 and the augmented reality display 64 operate independently and do not interfere with one another. The augmented reality head up display 14 and the augmented reality display 64 operate as a seamless system while augmenting a scene. The augmented reality head up display 14 is capable of providing images in a far plane that appear to be painted on the road and are perceived at a depth relative to (at a distance in front of) the occupant 58. The augmented reality display 64 creates images that appear on the windshield 54 itself.

The controller 34, in electronic communication with the at least one front camera 140, is adapted to use a trained neural network stored therein to map images captured by the at least one front camera 140 to light field camera images stored within the trained neural network and to identify hidden bodies 82 within the images captured by the at least one front camera 140 that are at least partially obscured by other bodies 84 within the images captured by the at least one front camera 140.

Figure 5:
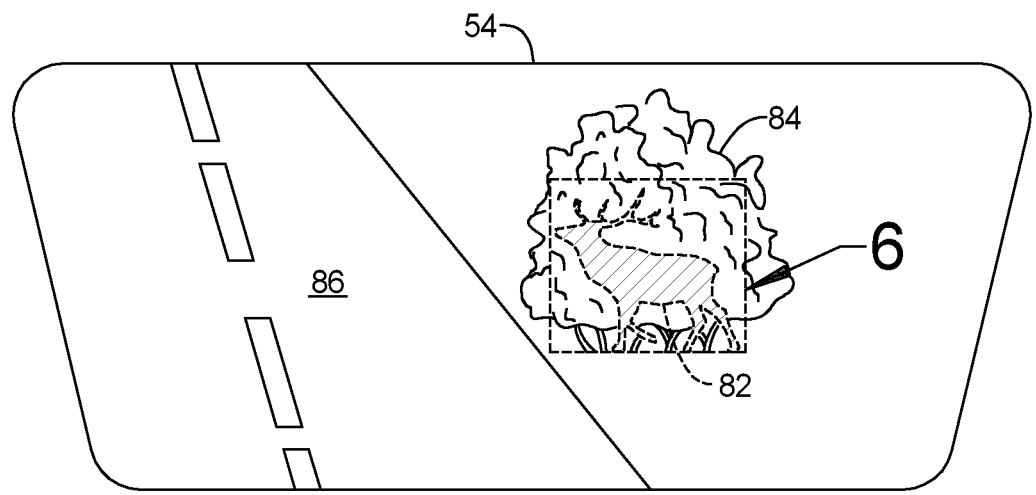
FIG. 5 is a schematic diagram of a view of a scene in front of the vehicle as seen through the windshield of the vehicle.
Figure 6:
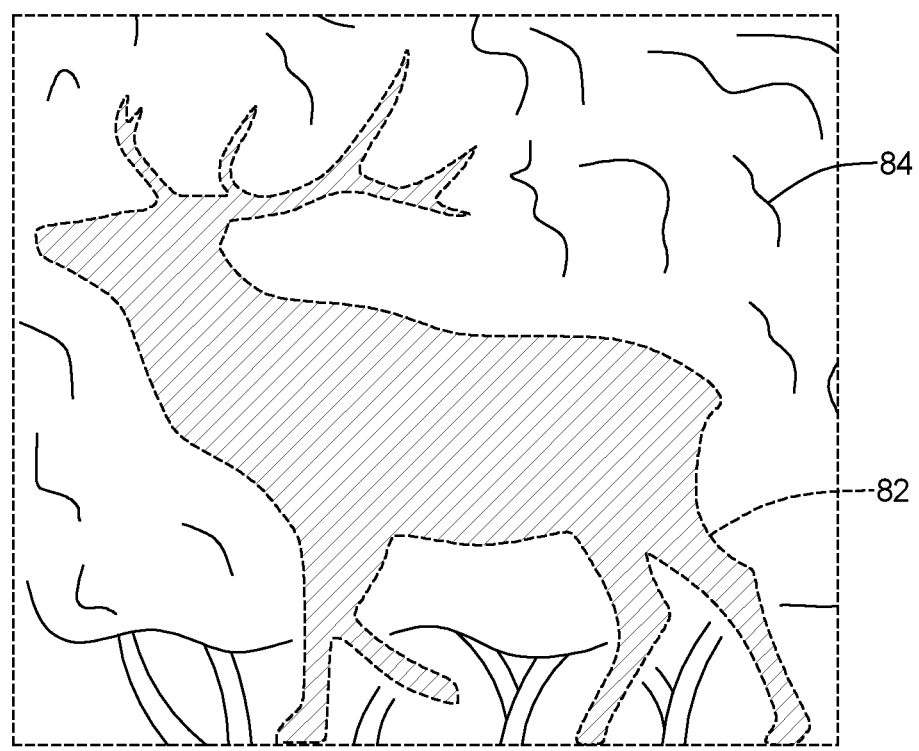
FIG. 6 is an enlarged portion of FIG. 5, as indicated by the outline labelled "6" in FIG. 5.

Referring to FIG. 5 and FIG. 6, a schematic is shown representing the windshield 54 and objects that appear within the roadway 86 upon which the vehicle 10 is traveling and adjacent to the roadway 86 that are visible to the occupant 58 of the vehicle 10 through the windshield 54. As shown, there is a body 84, here bushes, that are clearly visible to the occupant 58. However, there is a hidden body 82, here a deer, standing behind the bushes 84, that may not be visible to the occupant 58 because the deer 82 is camouflaged by the bushes 84. The controller 34 uses the trained neural network stored therein to map images captured by the at least one front camera 140 to the light field camera images stored within the trained neural network. This way, the controller 34 can identify the deer 82 behind the bushes 84. and display, within the windshield 54 of the vehicle 10, augmentation graphics 87 for the identified hidden bodies 82 in real time as such hidden bodies 82 are identified. This will bring the occupant's attention to hidden bodies 82 that may be camouflaged, allowing the occupant 58 to be aware and anticipate the possibility of such hidden bodies 82 moving within the roadway 86 ahead of the vehicle 10.

The trained neural network includes machine learning algorithms that are created by training an algorithm to detect hidden bodies 82 in light field images extracted from data collected by a light field camera array 88 that is mounted onto a control vehicle, that collects such data while traveling on roadways. A light field camera, also known as a plenoptic camera, is a camera that captures information about the light field emanating from a scene, that is, the intensity of light in a scene, and also the precise direction that the light rays are traveling in space. This contrasts with conventional cameras, which record only light intensity at various wavelengths. Referring to FIG. 7, one type of light field camera 88 includes an array of multiple individual cameras 90. Referring to FIG. 8 and FIG. 9, another type of light field camera 88 includes an array of micro-lenses 92 placed in front of an otherwise conventional image sensor 94 to sense intensity, color, and directional information. A structured light field can be captured by using either a fixed array of ordinary cameras 90 or custom light field cameras with multiple lenses 92 that focus light on a common matrix. Known optical parameters of each lens and the fixed distance allow capturing depth information for each pixel in each frame, thus allowing identification of hidden bodies 82 at the pixel level. The neural network, and machine learning algorithms, then use identification of such pixels to identify the presence and identification of such hidden bodies 82.

Figure 10:
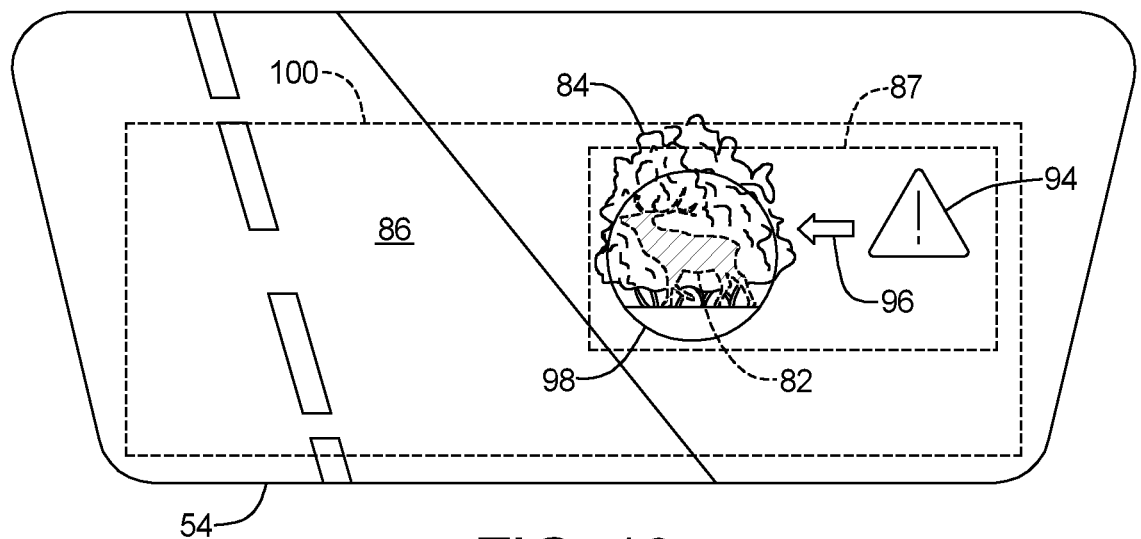
FIG. 10 is a schematic diagram of a view of a scene in front of the vehicle as seen through the windshield of the vehicle, wherein an augmentation graphic is displayed on the windshield within the field of view of the head up display.

When hidden bodies 82 are identified by the controller 34, the controller 34 is further adapted to determine proper augmentation graphics 87 for the identified hidden bodies 82. Referring to FIG. 10, the controller 34 has identified a hidden body 82, as shown a deer, behind other visible bodies 84, as shown bushes. In response to the identification of the hidden body 82, the controller displays on the windshield 54 an augmentation graphic 87 that is adapted to draw the occupant's 58 attention to the hidden body 82. As shown, the augmentation graphic 87 includes an alert triangle 94 with an exclamation point within and an arrow 96 pointing to an outline 98 which encircles the hidden body 82. The controller 34 may determine that other appropriate augmentation graphics 87 are to be displayed. For example, the controller 34 may display augmentation graphics 87 that are color coded based on the proximity of the hidden body 82 to the roadway 86 and if the hidden body 82 is moving toward or away from the roadway 86. For example, if the deer 82 shown in FIG. 10 is standing stationary, and is more than a pre-determined distance, for example 50 feet, from the roadway 86, then the controller 34 may display an augmentation graphic 87 that is yellow in color. However, if the deer 82 shown in FIG. 10 is moving toward the roadway, the controller 34 may display an augmentation graphic 87 that is red in color, indicating a higher risk. The controller 34 may also cause the augmentation graphic 87 to flash, or grow in intensity as the vehicle 10 gets nearer to the hidden body 82. Finally, if the machine learning algorithm is able to identify the hidden body 82 with a high level of accuracy, the controller 34 may include identification within the augmentation graphic 87, such as including the text "DEER" in the augmentation graphic 87 to inform the occupant 58 of the likely identification of the hidden body 82.

As mentioned above, the projector 50 of the AR-HUD 14 within the vehicle 10 is only able to project images onto the windshield 54 within a field of view (FOV) 100 of the AR-HUD 14. In an exemplary embodiment, when displaying, within the windshield 54 of the vehicle 10, augmentation graphics 87 for the identified hidden bodies 82, the controller 34 is further adapted to display, with the AR-HUD 14, on the inner surface 52 of the windshield 54, augmentation graphics 87 for the identified hidden bodies 82 adapted to draw the attention of the occupant 58 to such identified hidden bodies. Referring to FIG. 10, in this example, the augmentation graphic 87 is located within the FOV 100 of the AR-HUD 14, therefore, the AR-HUD 14 can be utilized to display the augmentation graphic 87.

Figure 11:
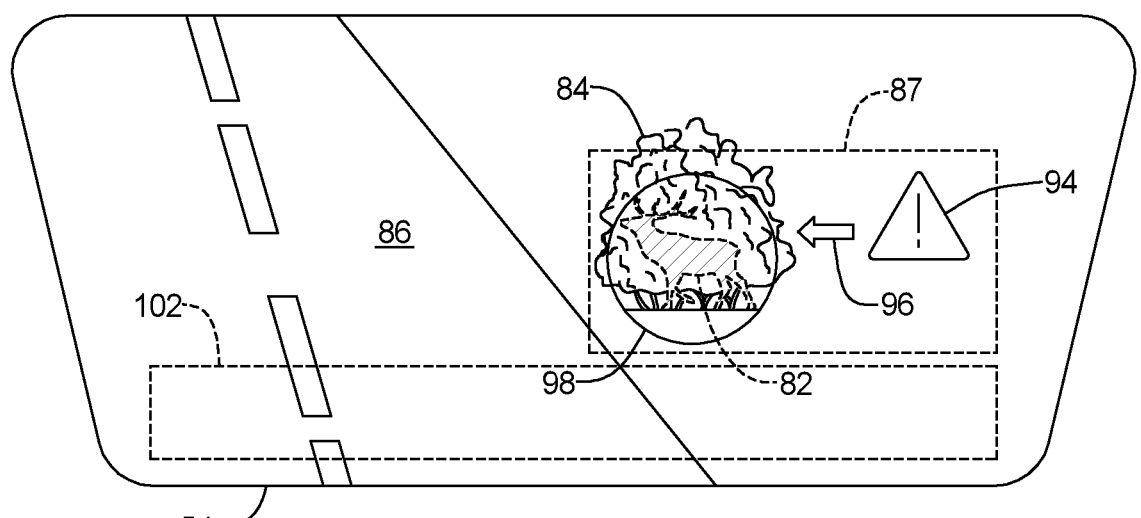
FIG. 11 is a schematic diagram of a view of a scene in front of the vehicle as seen through the windshield of the vehicle, wherein an augmentation graphic is displayed on the windshield outside of the field of view of the head up display.

In some circumstances, the hidden body 82 may be positioned such that an appropriate position for an augmentation graphic 87 is outside of the FOV 100 of the AR-HUD 14. Thus, when displaying, within the windshield 54 of the vehicle 10, augmentation graphics 87 for the identified hidden bodies 82, the controller 34 is further adapted to display, with the augmented reality display 64, within the windshield 54, augmentation graphics 87 for the identified hidden bodies 82 adapted to draw an occupant 58 of the vehicle's 10 attention to such identified hidden bodies 82. Referring to FIG. 11, in this example, the augmentation graphic 87 is positioned outside an FOV 102 of the AR-HUD 14, and thus, is displayed by the augmented reality display 64.

In an exemplary embodiment, the system 12 includes a driver monitoring system 104 in communication with the controller 34 and adapted to track a position of the occupant's 58 eyes, and the controller 34 is further adapted to receive data from the driver monitoring system 104 related to the position of the occupant's 58 eyes and to display augmentation graphics 87 within the windshield 54 at a position such that the augmentation graphics 87 are perceived by the occupant 58 in proximity to the corresponding identified hidden bodies 82, based on a position of the head 58H and eyes 58E of the occupant 58.

Figure 12:
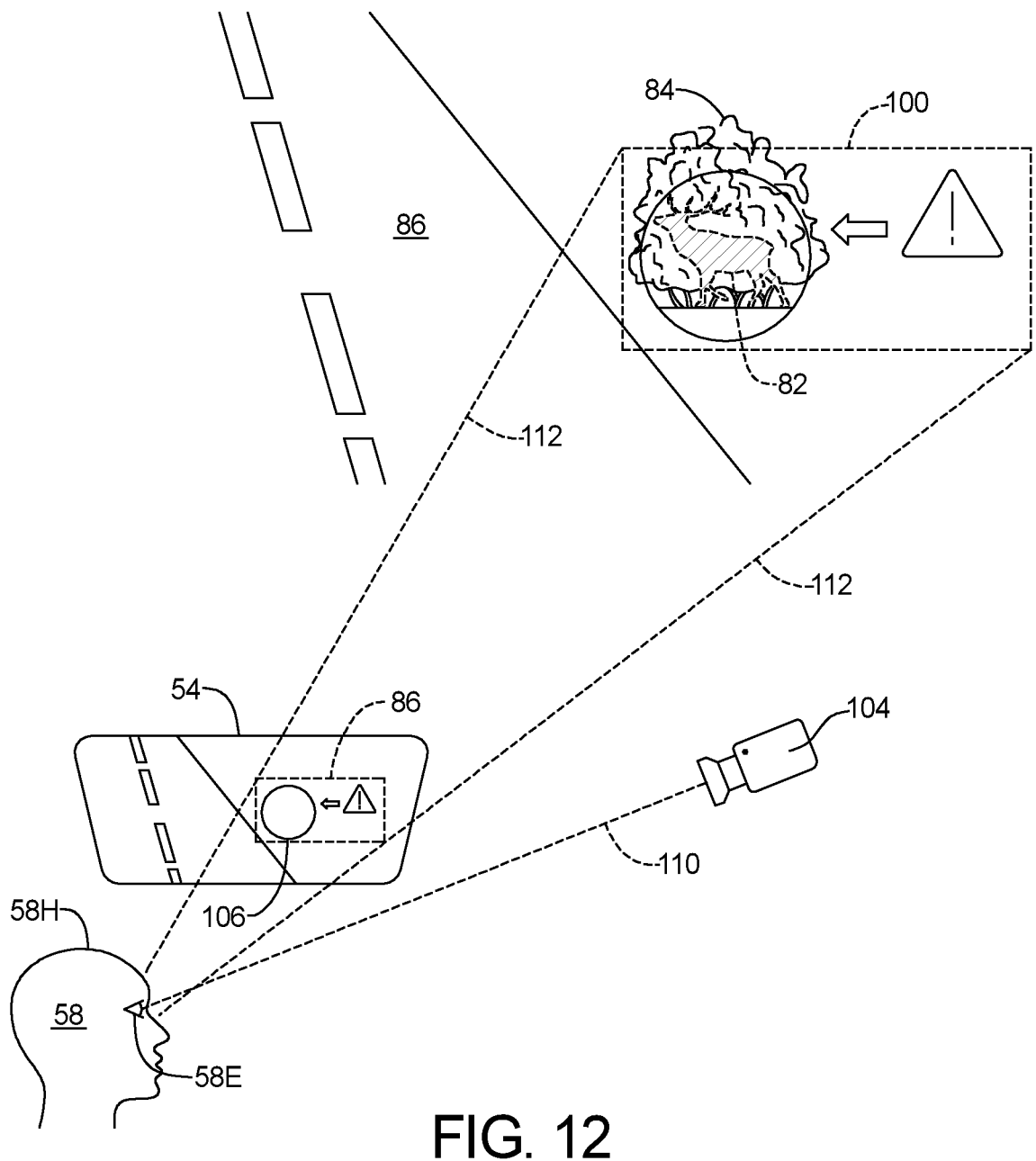
FIG. 12 is a schematic diagram illustrating the proper position of a displayed augmentation graphic on the windshield such that the occupant perceives the displayed augmentation graphic in proximity to a hidden body.

Referring to FIG. 12, in a schematic view of the occupant 58, the windshield 54 of the vehicle 10, and an augmentation graphic 87, the occupant 58 perceives the augmentation graphic 87 at a distance behind the windshield 54 in proximity to the hidden body 82. The AR-HUD 14 displays the augmentation graphic 87 at a proper location on the windshield 54 so the occupant 58 sees the augmentation graphic 87 at a proper location relative to the hidden body 82. As shown in FIG. 12, the hidden body 82 is a deer behind bushes 84. The augmentation graphic 87 is projected onto the windshield 54, as indicated at 106, such that, as the occupant 58 looks through the windshield 54, the occupant 58 perceives the augmentation graphic 87 in proper proximity to the hidden body 82, as shown in FIG. 10 and FIG. 11, and at 108 in FIG. 12.

The monitoring system 104 tracks the position of the occupant's 58 head 58H and eyes 58E with a camera, as indicated by line 110, and shares this data with the controller 34 which positions the augmentation graphic 87 at a location on the windshield 54, such that when the occupant 58 looks at the augmentation graphic 87 through the windshield 54, as indicated by lines 112, the occupant 58 sees the augmentation graphic 86 at the proper location relative to the hidden body 82.

The monitoring system 104 continuously tracks movement of the head 58H and eyes 58E of the occupant 58 and adjusts the position that the augmentation graphic 87 is displayed on the windshield 54 to ensure that the occupant 58 always perceives the augmentation graphic 87 at the proper location relative to the hidden body 82.

Figure 13:
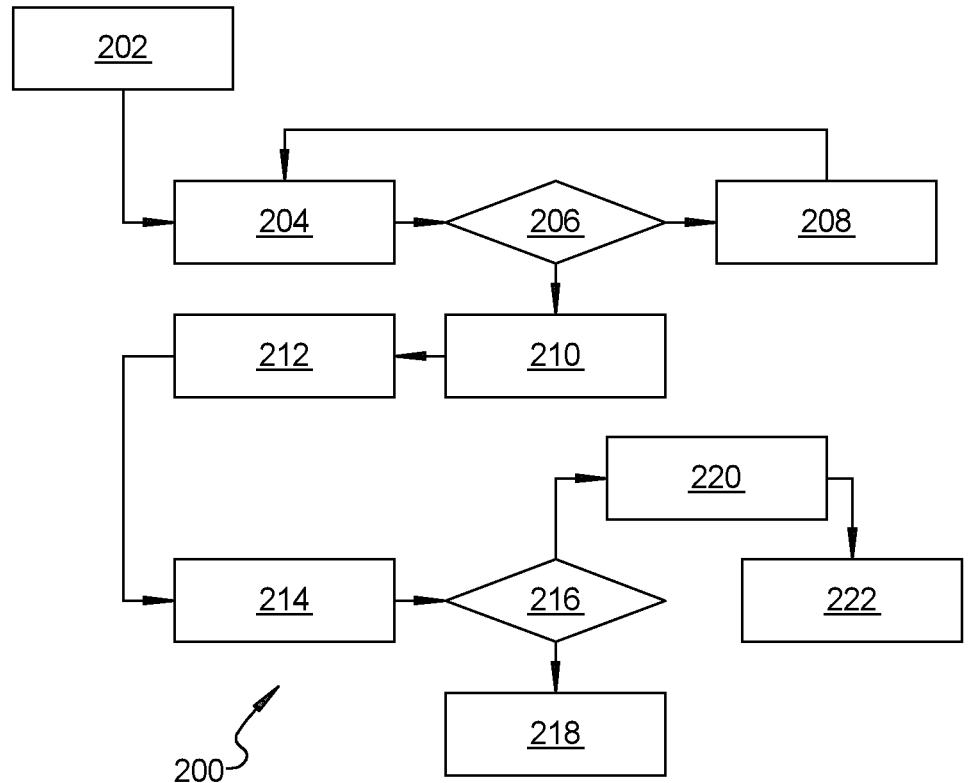
FIG. 13 is a flow chart illustrating a method according to an exemplary embodiment of the present disclosure.

Referring to FIG. 13, a method 200 of identifying hidden bodies 82 and providing augmentation graphics 87 within a head up display 14 of a vehicle 10 includes, beginning at block 202, an occupant operates the vehicle 10. Moving to block 204, the method 200 includes collecting, with the at least one front camera 140, images of an environment in front of the vehicle 10 within the roadway 86 on which the vehicle 10 is traveling and adjacent the roadway 86 on either side and using, with the controller, a trained neural network stored therein and mapping images captured by the at least one front camera to light field camera images stored within the trained neural network to identify hidden bodies within the images captured by the at least one front camera that are at least partially obscured by other bodies within the images captured by the at least one front camera.

Moving to block 206, if no hidden bodies 82 are identified by the controller 34, then, moving to block 208, the method 200 re-sets by moving back to block 204. Moving again to block 206, when hidden bodies 82 are identified within the images captured by the at least one front camera 140, moving to block 210, the method 200 includes determining, with the controller 34, a proper augmentation graphic 87 for the identified hidden bodies 82.

Figure 14:
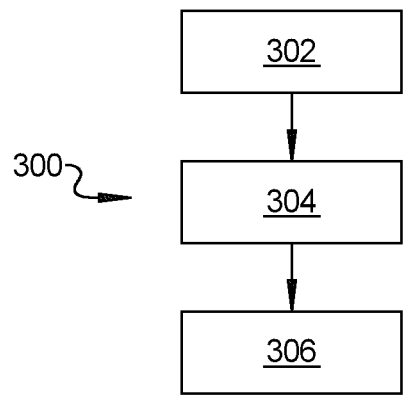
FIG. 14 is a flow chart illustrating how the neural network is trained.

Referring to FIG. 14, a schematic flow chart 300 is shown that illustrates how the neural network is trained. In an exemplary embodiment, the neural network is trained by, starting at block 302, collecting data from a light field camera array 88 mounted onto a control vehicle, moving to block 304, training a machine learning algorithm to detect hidden bodies 82 in in an image extracted from the collected data, and, moving to block 306, transferring the machine learning algorithm to the neural network that is in communication with the at least one front camera 140.

In an exemplary embodiment, the system further includes a driver monitoring system 104 in communication with the controller 34 and adapted to track a position of an occupant's 58 eyes. Referring again to FIG. 13, the method 200 further including, moving to block 212, receiving data, with the controller 34, from the driver monitoring system 104, related to the position of the occupant's 58 eyes and, moving to block 214, determining a proper location on the windshield 54 to display augmentation graphics 87 such that the augmentation graphics 87 are perceived by the occupant 58 in proximity to the corresponding identified hidden bodies 82.

Moving to block 216, the method 200 further includes determining, with the controller 34 if the proper location for displaying augmentation graphics 87 within the windshield 54 falls within the FOV 100 of the AR-HUD 14 within the vehicle 10. Moving to block 218, if the proper location for the augmentation graphics 87 is within the FOV 100 of the AR-HUD 14, the method 200 further includes displaying, with at least one light source of a projection module of the AR-HUD 14 adapted to project an image upon the inner surface 52 of the windshield 54 of the vehicle 10 and in electronic communication with the controller 34, augmentation graphics 87 for the identified hidden bodies 82 adapted to draw an occupant 58 of the vehicle's 10 attention to such identified hidden bodies 82.

If, at block 216, the proper location for displaying augmentation graphics 87 does not fall within the FOV 100 of the AR-HUD 14, them, moving to block 220, the method 200 includes activating the augmented reality display 64, and moving to block 222, displaying, with the augmented reality display 64 in communication with the controller 34 and positioned within the vehicle 10, augmentation graphics 87 for the identified hidden bodies 82 adapted to draw an occupant 58 of the vehicle's 10 attention to such identified hidden bodies 82.

A system 12 and method 200 of the present disclosure offers several advantages. These include the ability to detect, identify and provide a warning to the driver for hidden bodies 82 that are in front of the vehicle 10 on or adjacent to the roadway 86 on which the vehicle 10 is traversing. Such hidden bodies 82 could be animals that are hidden by bushes or trees and may run into the roadway 86, pedestrians that may be about to cross the roadway 86 in front of the vehicle 10 and are camouflaged by other objects, such as trees, street signs, or other vehicles parked on the side of the roadway 86, etc. Such hidden objects 82 could be other vehicles, wherein the system 12 and method 200 of the present disclosure detects and identifies these other vehicles as the vehicle 10 approaches an intersection or sharp curve within the roadway 86.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for identifying hidden bodies and providing augmentation within a head up display of a vehicle, comprising:

at least one front camera adapted to collect images of an environment in front of the vehicle within a roadway on which the vehicle is traveling and adjacent the roadway on either side;

an augmented reality head up display in communication with a controller and adapted to project an image upon an inner surface of a windshield of the vehicle; and an augmented reality display in communication with the controller and adapted to project an image within the windshield;

wherein, the controller is in electronic communication with the at least one front camera, and includes a trained neural network stored therein that includes machine learning algorithms adapted to detect hidden bodies within extracted images from data collected with a light field camera array; and the controller is adapted to use the trained neural network stored therein to map images captured by the at least one front camera to light field camera images, captured by a light field camera array and stored within the trained neural network and to capture depth information for each pixel within the images captured by the at least one front camera and the light field camera images, wherein the trained neural network and the machine learning algorithms use the depth information to identify hidden bodies within the images captured by the at least one front camera that are at least partially obscured by other bodies within the images captured by the at least one front camera at the pixel level, and display, within a windshield of the vehicle, augmentation graphics for the identified hidden bodies in real time as such hidden bodies are identified.

2. The system of claim 1, wherein the trained neural network includes machine learning algorithms collected by training an algorithm to detect hidden bodies in light field images extracted from data collected by a light field camera array mounted onto a control vehicle.

3. The system of claim 1, wherein the controller is further adapted to, when hidden bodies are identified within the images captures by the at least one front camera, determine proper augmentation graphics for the identified hidden bodies.

4. The system of claim 1, wherein, when displaying, within the windshield of the vehicle, augmentation graphics for the identified hidden bodies, the controller is further adapted to display, with the augmented reality head up display, on the inner surface of the windshield, augmentation graphics for the identified hidden bodies adapted to draw an occupant of the vehicle's attention to such identified hidden bodies.

5. The system of claim 1, wherein, when displaying, within the windshield of the vehicle, augmentation graphics for the identified hidden bodies, the controller is further adapted to display, with the augmented reality display, within the windshield, augmentation graphics for the identified hidden bodies adapted to draw an occupant of the vehicle's attention to such identified hidden bodies.

6. The system of claim 5, wherein the augmented reality display includes:

a transparent substrate, having light emitting particles dispersed therein, positioned on the windshield;

a primary graphic projection device for generating a first set of images upon the windshield based on visible light, wherein the first set of images are displayed upon a primary area of the window;

a secondary graphic projection device for generating a second set of images upon a secondary area the windshield based on an excitation light, wherein the light emitting particles in the transparent substrate emit visible light in response to absorbing the excitation light, and wherein the first set of images displayed upon the primary area of the windshield cooperate with the second set of images displayed upon the secondary area of the windshield to create an edge-to-edge augmented reality view of the environment in front of the vehicle within the roadway on which the vehicle is traveling and adjacent the roadway on either side;

a primary graphics processing unit in electronic communication with the primary graphic projection device and the controller; and a secondary graphics processing unit in electronic communication with the secondary graphic projection device and the controller.

7. The system of claim 1, further including a driver monitoring system in communication with the controller and adapted to track a position of an occupant's eyes.

8. The system of claim 7, wherein the controller is further adapted to receive data from the driver monitoring system related to the position of the occupant's eyes and to display augmentation graphics within the windshield at a position such that the augmentation graphics are perceived by the occupant in proximity to the corresponding identified hidden bodies.

9. The system of claim 1, wherein the trained neural network includes machine learning algorithms adapted to detect hidden bodies within extracted images from data collected with a light field camera array including one of an array of multiple individual cameras or an array of microlenses placed in front of an image sensor, wherein the controller is adapted to map images collected by the at least one front camera onto the light field camera array images and use the machine learning algorithms to identify hidden bodies within the images collected by the at least one front camera.

10. A method of identifying hidden bodies and providing augmentation within a head up display of a vehicle, comprising:

collecting, with at least one front camera, images of an environment in front of the vehicle within a roadway on which the vehicle is traveling and adjacent the roadway on either side;

using, with a controller in electronic communication with the at least one front camera, a trained neural network stored therein that includes machine learning algorithms adapted to detect hidden bodies within extracted images from data collected with a light field camera array, and mapping images captured by the at least one front camera to light field camera images captured by a light field camera array and stored within the trained neural network;

capturing depth information for each pixel within the images captured by the at least one front camera and the light field camera images;

using, with the trained neural network and the machine learning algorithms, the depth information and identifying, with the controller, the trained neural network and the machine learning algorithms, hidden bodies within the images captured by the at least one front camera that are at least partially obscured by other bodies within the images captured by the at least one front camera at the pixel level; and displaying, within a windshield of the vehicle, augmentation graphics for the identified hidden bodies in real time as such hidden bodies are identified.

11. The method of claim 10, wherein the neural network is trained by:
collecting data from a light field camera array mounted onto a control vehicle;
training a machine learning algorithm to detect hidden bodies in in an image extracted from the collected data; and
transferring the machine learning algorithm to the neural network that is in communication with the at least one front camera.

12. The method of claim 10, further including, when hidden bodies are identified within the images captured by the at least one front camera, determining, with the controller, a proper augmentation graphics for the identified hidden bodies.

13. The method of claim 10, wherein, the displaying, within the windshield of the vehicle, augmentation graphics for the identified hidden bodies further includes displaying, with at least one light source of a projection module adapted to project an image upon an inner surface of a windshield of the vehicle and in electronic communication with the controller, augmentation graphics for the identified hidden bodies adapted to draw an occupant of the vehicle's attention to such identified hidden bodies.

14. The method of claim 10, wherein, the displaying, within the windshield of the vehicle, augmentation graphics for the identified hidden bodies further includes displaying, with an augmented reality display in communication with the controller and positioned within the vehicle, augmentation graphics for the identified hidden bodies adapted to draw an occupant of the vehicle's attention to such identified hidden bodies.

15. The method of claim 14, wherein the augmented reality display includes:
a transparent substrate, having light emitting particles dispersed therein, positioned on the windshield;
a primary graphic projection device for generating a first set of images upon the windshield based on visible light, wherein the first set of images are displayed upon a primary area of the windshield;
a secondary graphic projection device for generating a second set of images upon a secondary area the windshield based on an excitation light, wherein the light emitting particles in the transparent substrate emit visible light in response to absorbing the excitation light, and wherein the first set of images displayed upon the primary area of the windshield cooperate with the second set of images displayed upon the secondary area of the windshield to create an edge-to-edge augmented reality view of the environment in front of the vehicle within the roadway on which the vehicle is traveling and adjacent the roadway on either side;
a primary graphics processing unit in electronic communication with the primary graphic projection device and the controller; and
a secondary graphics processing unit in electronic communication with the secondary graphic projection device and the controller.

16. The method of claim 10, wherein the system further includes a driver monitoring system in communication with the controller and adapted to track a position of an occupant's eyes.

17. The method of claim 16, further including receiving data, with the controller, from the driver monitoring system related to the position of the occupant's eyes, and, displaying augmentation graphics within the windshield at a position such that the augmentation graphics are perceived by the occupant in proximity to the corresponding identified hidden bodies.

18. The method of claim 10, wherein the trained neural network includes machine learning algorithms adapted to detect hidden bodies within extracted images from data collected with a light field camera array including one of an array of multiple individual cameras or an array of microlenses placed in front of an image sensor, wherein, the method includes mapping images collected by the at least one front camera onto the light field camera array images and using the machine learning algorithms to identify hidden bodies within the images collected by the at least one front camera.

19. A method of identifying hidden bodies and providing augmentation within a head up display of a vehicle, comprising:
collecting, with at least one front camera, images of an environment in front of the vehicle within a roadway on which the vehicle is traveling and adjacent the roadway on either side;
using, with a controller in electronic communication with the at least one front camera, a trained neural network that includes machine learning algorithms adapted to detect hidden bodies within extracted images from data collected with a light field camera array and stored therein and mapping images captured by the at least one front camera to light field camera images captured by a light field camera array and stored within the trained neural network, wherein the neural network is trained by collecting data from a light field camera array mounted onto a control vehicle, training a machine learning algorithm to detect hidden bodies in in an image extracted from the collected data, and transferring the machine learning algorithm to the neural network that is in communication with the at least one front camera;
capturing depth information for each pixel within the images captured by the at least one front camera and the light field camera images;
using, with the trained neural network and the machine learning algorithms, the depth information and identifying, with the controller, the trained neural network and the machine learning algorithms, hidden bodies within the images captured by the at least one front camera that are at least partially obscured by other bodies within the images captured by the at least one front camera at the pixel level;
determining, with the controller, proper augmentation graphics for the identified hidden bodies;
receiving data, with the controller, from a driver monitoring system related to a position of an occupant's eyes; and
displaying, within a windshield of the vehicle, augmentation graphics for the identified hidden bodies at a position such that the augmentation graphics are perceived by the occupant in proximity to the corresponding identified hidden bodies in real time as such hidden bodies are identified.

20. The method of claim 19, wherein, the displaying, within the windshield of the vehicle, augmentation graphics for the identified hidden bodies further includes one of:
displaying, with at least one light source of a projection module adapted to project an image upon an inner surface of a windshield of the vehicle and in electronic communication with the controller, augmentation graphics for the identified hidden bodies adapted to draw an occupant of the vehicle's attention to such identified hidden bodies; and displaying, with an augmented reality display in communication with the controller and positioned within the vehicle, augmentation graphics for the identified hidden bodies adapted to draw an occupant of the vehicle's attention to such identified hidden bodies.

* * * * *